(12) United States Patent
Quier

(10) Patent No.: US 7,882,854 B2
(45) Date of Patent: Feb. 8, 2011

(54) END HOSE FOR DISCHARGE OF THICK SUBSTANCES

(75) Inventor: Austin Quier, Bakewell (GB)

(73) Assignee: Putzmeister Engineering GmbH, Aichtal (DE)

( * ) Notice: Subject to any disclaimer, the term of this patent is extended or adjusted under 35 U.S.C. 154(b) by 914 days.

(21) Appl. No.: 11/792,655

(22) PCT Filed: Nov. 25, 2005

(86) PCT No.: PCT/EP2005/012610

§ 371 (c)(1),
(2), (4) Date: Jun. 8, 2007

(87) PCT Pub. No.: WO2006/063670

PCT Pub. Date: Jun. 22, 2006

(65) Prior Publication Data

US 2008/0131250 A1    Jun. 5, 2008

(30) Foreign Application Priority Data

Dec. 13, 2004    (DE) .................... 10 2004 060 106

(51) Int. Cl.
*F16L 11/12* (2006.01)

(52) U.S. Cl. .................. 137/615; 138/109; 138/118; 138/124; 138/127

(58) Field of Classification Search .............. 137/615; 138/103, 108, 110, 124, 126, 127, 153, 109, 138/118, 118.1
See application file for complete search history.

(56) References Cited

U.S. PATENT DOCUMENTS

| 3,610,289 A | 10/1971 | Moss |
| 3,918,749 A * | 11/1975 | Taylor ........................ 138/109 |
| 4,661,396 A * | 4/1987 | Andorf et al. ............... 138/103 |
| 4,675,221 A * | 6/1987 | Lalikos et al. ............... 138/110 |
| 4,773,452 A * | 9/1988 | Dotti et al. .................. 138/127 |
| 5,435,867 A | 7/1995 | Wolfe et al. |
| 5,823,218 A * | 10/1998 | Schlecht et al. ............. 137/615 |
| 6,755,212 B1 * | 6/2004 | Bissen et al. ................ 137/615 |

FOREIGN PATENT DOCUMENTS

| BE | 906 003 A1 | 4/1987 |
| DE | 10 86 500 B | 8/1960 |
| DE | 7147988 | 8/1972 |
| DE | 22 52 206 A1 | 5/1974 |
| DE | 44 12 643 A1 | 3/1995 |
| DE | 195 43751 | 5/1996 |

(Continued)

OTHER PUBLICATIONS

International Search Report, dated Mar. 22, 2007.

*Primary Examiner*—Kevin L Lee
(74) *Attorney, Agent, or Firm*—Collard & Roe, P.C.

(57) ABSTRACT

The invention relates to an end hose for discharge of thick substances, particularly of liquid concrete. The end hose (12) can be connected with its entry-side end to a pressure feed line (14) of a mobile thick-matter pump, and has a discharge opening (16) for the thick substances at its exit-side end, and consists of a flexible material. In order to prevent the end hose (12) from kicking out when blockages are loosened, it has at least two hose parts (26, 28) having different bending rigidity, connected with one another at a transition point (30).

16 Claims, 8 Drawing Sheets

FOREIGN PATENT DOCUMENTS

| | | |
|---|---|---|
| DE | 29720 549 U1 | 2/1998 |
| DE | 69220784 T | 2/1998 |
| DE | 10011471 A1 | 9/2001 |
| EP | 0 415 690 A | 3/1991 |
| FR | 2 414 850 A | 8/1979 |
| FR | 2 567 986 A | 1/1986 |
| FR | 2 678 703 A | 1/1993 |
| GB | 1 245 968 A | 9/1971 |
| JP | 2004068531 A | 3/2004 |
| JP | 2004270232 A | 9/2004 |

* cited by examiner

END HOSE FOR DISCHARGE OF THICK SUBSTANCES

CROSS REFERENCE TO RELATED APPLICATIONS

Applicant claims priority under 35 U.S.C. §119 of German Application No. 10 2004 060 106.2 filed Dec. 13, 2004. Applicant also claims priority under 35 U.S.C. §365 of PCT/EP2005/012610 filed Nov. 25, 2005. The international application under PCT article 21(2) was not published in English.

BACKGROUND OF THE INVENTION

1. Field of the Invention

The invention relates to an end hose for discharge of thick substances, particularly of liquid concrete, which can be connected with its entry-side end to a pressure feed line and has a discharge opening for the thick substances at its exit-side end, and which consists of flexible material.

2. The Prior Art

End hoses of this type are, for example, components of a feed device for liquid concrete. There, they form the end of a pressure feed device, whose pressure feed lines can be disposed on the concrete distributor mast of a stationary or mobile concrete pump. The end hose is connected, at its entry-side end, with the pressure feed line to which liquid concrete is applied by way of a pump, and hangs vertically down from the mast tip in the operating state. In order for an operator (end hose operator) to be able to guide it, with its discharge opening, to an application site, by hand, within a certain circumference, it has not only its articulated suspension on the mast tip but also a certain flexibility. Therefore it consists predominantly of a flexible material, for example of rubber or of an elastomer plastic. In the feed of thick substances of this type, blockage formations in the feed lines or in the end hose can always occur, again and again. Such blockages are generally loosened by means of building up a corresponding excess pressure in the pressure feed line. Greater forces occur at the end hose when blockages are loosened, and because of the flexibility of the end hose, these forces can cause the end hose to kick out. Kicking out of the end hose can also occur when the thick substance column is first pumped up, or if air inclusions are released. In this connection, situations that are hazardous for the operator can occur, when the operator can no longer keep hold of the end hose.

SUMMARY OF THE INVENTION

Proceeding from this, the invention is based on the task of improving the end hose of the type indicated initially in such a manner that the risk of the end hose kicking out when blockages are loosened is reduced.

To accomplish this task, a distributor mast of a concrete pump, having a plurality of mast arms connected with one another at bending joints, and having a pressure feed line composed of several segments, guided by way of the plurality of mast arms, to which liquid concrete is applied by way of a pump, having a mast tip at an end of the pressure feed line, and having an end hose that hangs down vertically and is connected to the end of the pressure feed line, the end hose comprising flexible material and having an entry-side hose part, the end hose having a discharge opening for the liquid concrete at its exit-side hose part, whereby the entry-side hose part and the exit-side hose part are connected with one another at a transition point, whereby the bending rigidity of the exit-side hose part, starting from the transition point, is greater than that of the entry-side hose part, and whereby the entry-side and exit-side hose parts have an elastomer hose material having different material hardness is proposed. Advantageous embodiments and further developments of the invention are discussed below.

The solution according to the invention proceeds from the idea that at least two hose parts having different bending rigidity, connected with one another at a transition point, are provided. A preferred embodiment of the invention provides that the bending rigidity of the exit-side hose part is greater than that of the entry-side hose part. It is advantageous if the lower bending rigidity is achieved by means of a lesser hardness. The region of lesser hardness makes it possible to position and distribute the exiting thick-matter material, while the region of greater rigidity and hardness prevents the end hose from kicking out during the pressure discharge.

According to an advantageous embodiment of the invention, the hose parts having different bending rigidity accordingly have an elastomer material having different material hardness. The hose parts having different bending rigidity can have a different wall thickness while having the same hose material. In particular, in this connection, the wall thickness of the hose parts is configured to be increasing or decreasing in the transition region, whereby it is practical if the inside diameter in the hose parts having different bending rigidity is constant.

It is advantageous if at least one of the hose parts has a woven fabric insert. The woven fabric inserts in the hose parts having great rigidity can be more tightly braided or woven, in this connection, than in the hose part having low rigidity. The same can be done by means of a change in the distance of the insert from the bending line.

Another advantageous embodiment variant consists of the fact that at least one of the hose parts has a material having greater strength, e.g. a steel wire insert. Here again, the insert amount or density can be selected to be different in the different hose parts. In a special case, the steel wire insert in the hose part having greater rigidity can be wound more tightly than in the hose part having lower rigidity.

Another advantageous embodiment of the invention provides that the hose part having greater rigidity has a steel wire insert and the hose part having lesser rigidity has a woven fabric insert.

When using a hose material made of a wound plastic non-woven fabric, e.g. carbon fiber reinforced plastic, woven fiber reinforced plastic, or compound non-woven fabric, the different bending thickness can also be achieved by means of different winding density.

It is advantageous if the hose parts having different bending rigidity are connected with one another in one piece at the transition point. Fundamentally, however, it is also possible that the hose parts having different bending rigidity are releasably coupled with one another at the transition point.

The end hoses according to the invention are preferably used in connection with pressure feed lines for thick substances, particularly for liquid concrete, whereby the end hose is disposed at the end of the pressure feed line. In this connection, it is practical if the pressure feed line is disposed on a distributor mast of a stationary or mobile thick-matter pump, which mast has several mast arms connected with one another at bending joints. The pressure feed line in turn is composed of several segments that carry the end hose at their one end. The feed line segments can consist of a metal, preferably of steel, or of a composite material, preferably of fiber-reinforced plastic with a friction-wear-resistant inner coating.

BRIEF DESCRIPTION OF THE DRAWINGS

In the following, the invention will be explained in greater detail using exemplary embodiments shown schematically in the drawing. This shows.

DETAILED DESCRIPTION OF THE PREFERRED EMBODIMENTS

Figure 1:
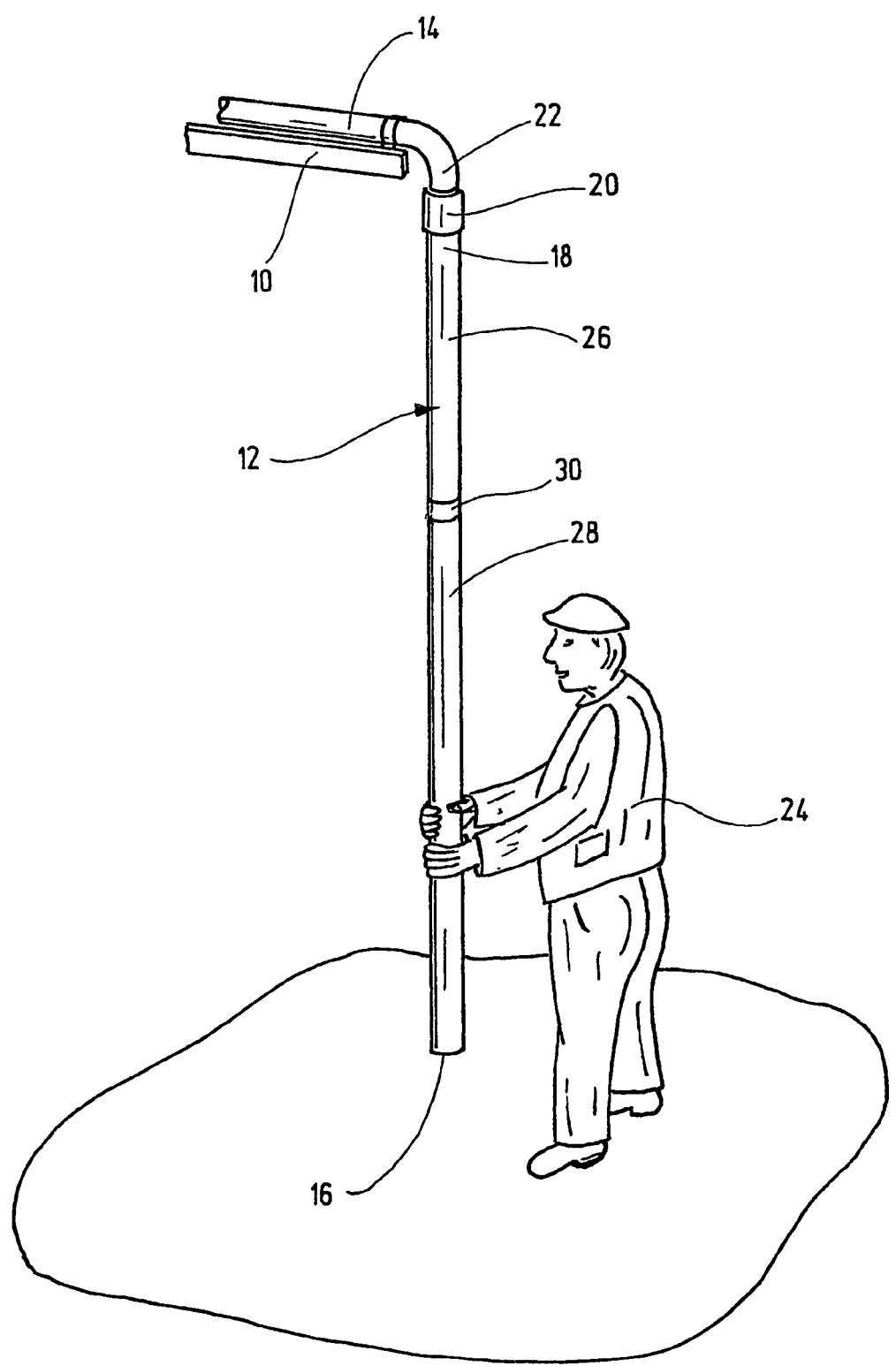
FIG. 1 the mast tip of a distributor mast of a mobile concrete pump having an end hose.

FIG. 1 shows the mast tip 10 of a distributor mast, not shown for the remainder, configured as a bending mast, of a mobile concrete pump, which carries an end hose 12 that hangs vertically down in an operating state, which hose is connected with a pressure feed line 14 to which concrete is applied by way of a pump, guided along the concrete distributor mast at its upper end, and through the outlet opening 16 of which hose, which faces down, the transported liquid concrete exits into an application site on the construction site. The end hose 12 carries a metallic connector piece 20 on its entry-side end 18, with which piece it is connected with the exit-side end 22 of the pressure feed line 14, so as to rotate. So that the operator 24 (end hose operator) can pivot the end hose 12 when the mast tip 10 is standing in place, in a certain circumference above the application site, the end hose 12 consists of a flexible material, for example of rubber or of an elastomer plastic. On the other hand, the flexibility of the end hose 12 is not allowed to be so great, particularly in the exit-side lower region, that kicking out of the end hose can occur when loosening blockages, since this could represent a hazard for the operator 24.

In order to achieve this, the end hose 12 consists, in the case of the exemplary embodiment shown in FIG. 1, of two hose parts 26, 28, of which the upper hose part 26 has a lesser bending rigidity, and the lower hose part 28 has a greater bending rigidity. The two hose parts 26, 28 are connected with one another, in one piece, in a transition region 30.

The exemplary embodiments shown schematically in FIG. 2a to 2f show different variants for the internal structure of an end hose having hose parts having different rigidity.

Figure 2A:
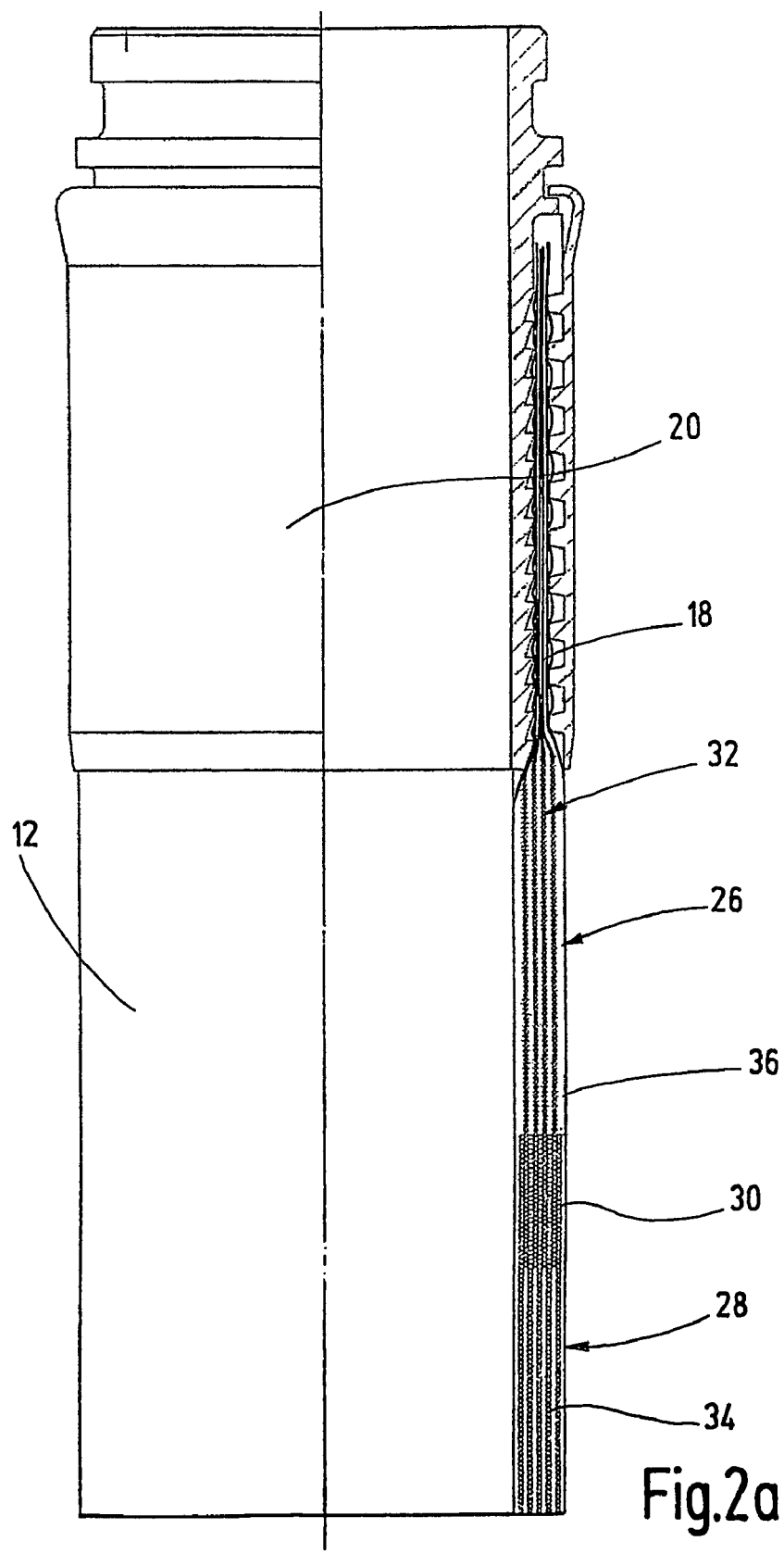
FIG. 2a to 2f different variants of an end hose having different bending rigidity over the length, in a representation in partial section, and reduced in length.

In the case of the embodiment variant shown in FIG. 2a, the end hose consists of a rubber material that is uniform over the entire length, which contains a woven fabric insert 32 in the region of the upper hose part 26 and a steel wire insert 34 in the region of the lower hose part 28. In the transition region 30, the woven fabric insert 32 and the steel wire insert 34 are linked with one another. The structure material 36, which consists of rubber, has the same Shore hardness over the entire length of the end hose 12. The different bending rigidity of the two hose parts 26 and 28 results exclusively from the different flexibility of the inserts 32, 34.

Figure 2B:
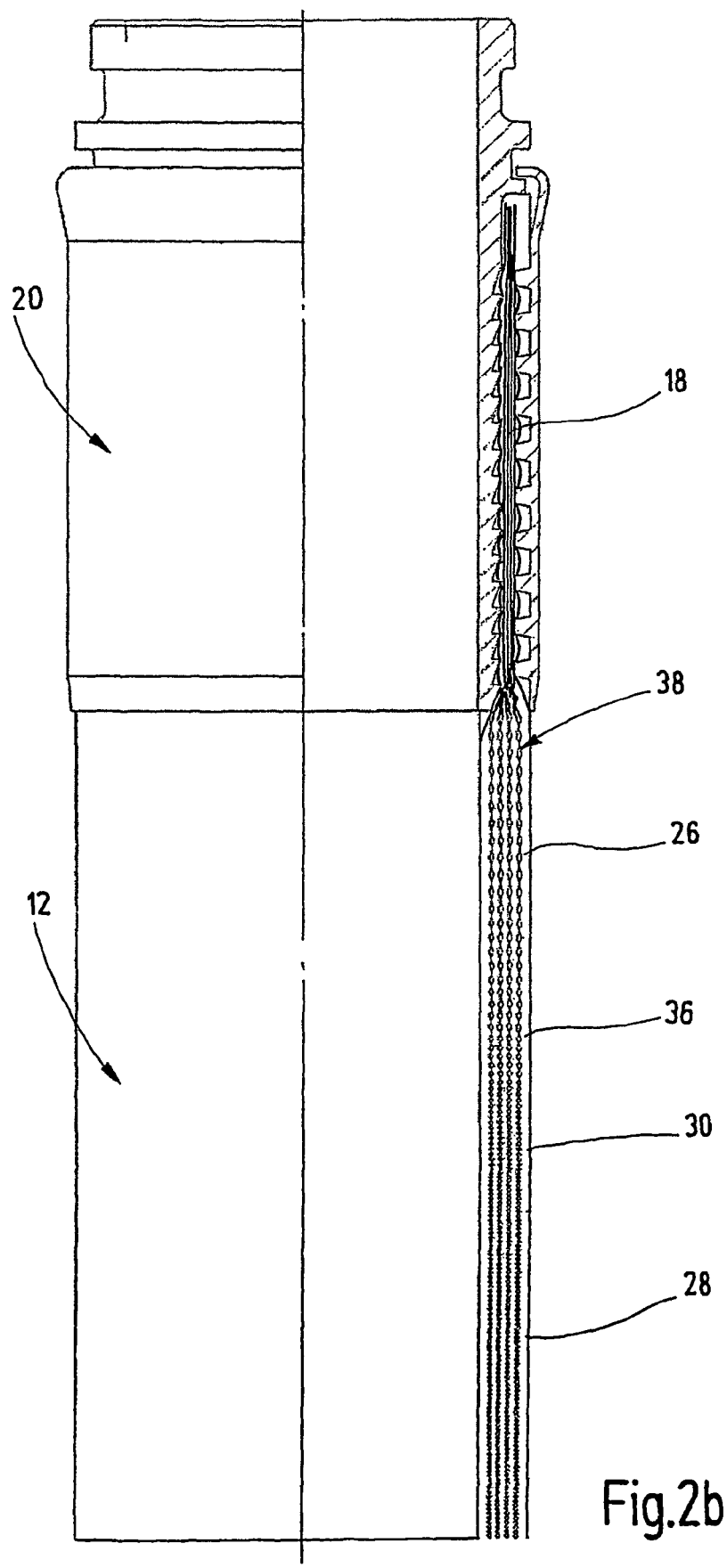

In the case of the exemplary embodiment according to FIG. 2b, a woven fabric insert that is continuous from the top to the bottom is provided. The structure material 36, which consists of rubber, consists of rubber having the same Shore hardness throughout. The different bending rigidity is achieved in that the woven fabric insert 38 has a greater mesh width in the region of the upper hose part 26 than in the region of the lower hose part 28. The woven fabric insert 38 is also not interrupted in the transition region 30. Instead, all that happens there is that the mesh width is changed, constantly or in steps, from top to bottom. With these measures, as well, a greater bending rigidity is obtained in the lower hose part 28 than in the upper hose part 26.

Figure 2C:
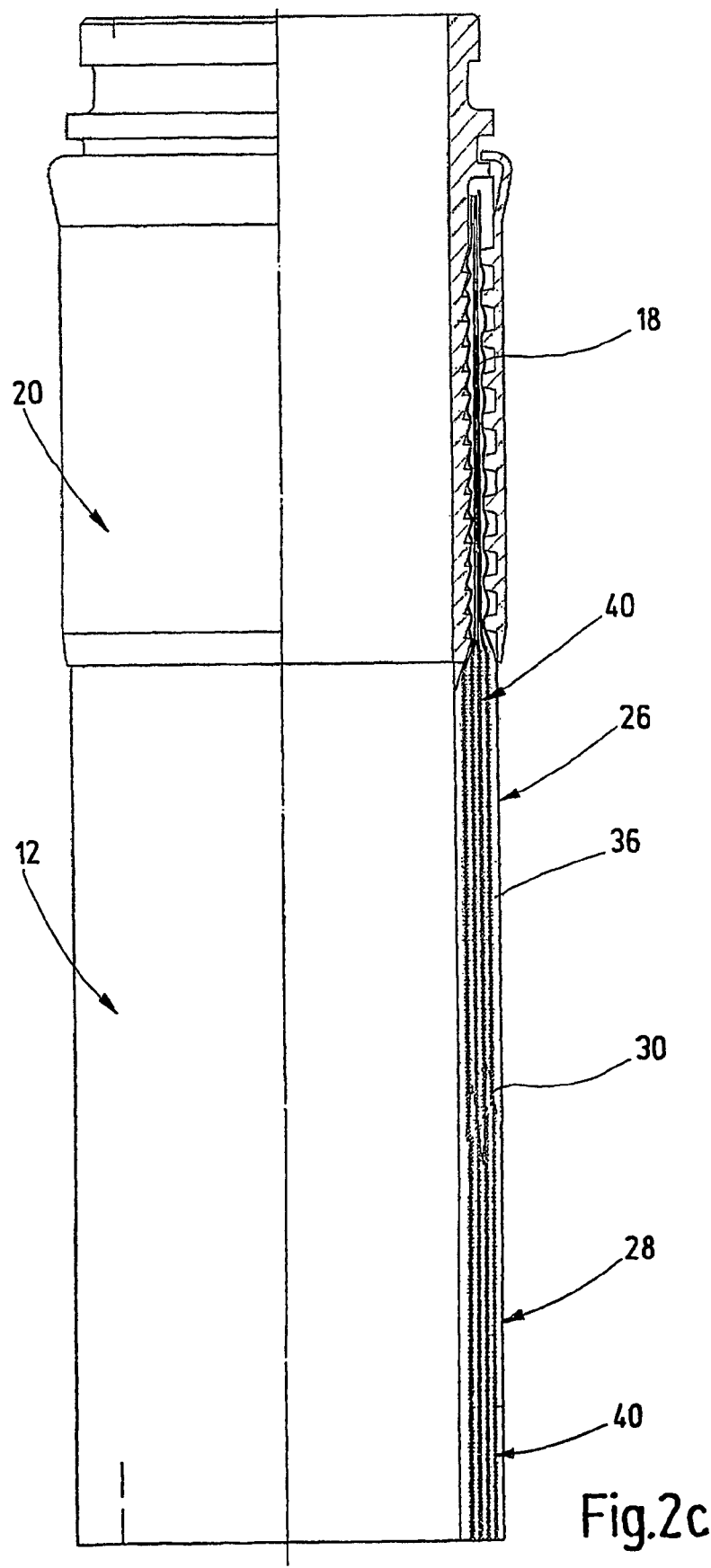

In the case of the exemplary embodiment according to FIG. 2c, there is a woven fabric insert 40 having a constant mesh width in the upper and lower hose part 26, 28. Here, the end hose 12 is composed of two partial hoses that contain a softer rubber mixture, forming the upper hose part 26, and a harder rubber mixture in the lower hose part 28. The transition region 30 is formed by a vulcanization region in which the two hose parts 26, 28 have been vulcanized onto one another.

Figure 2D:
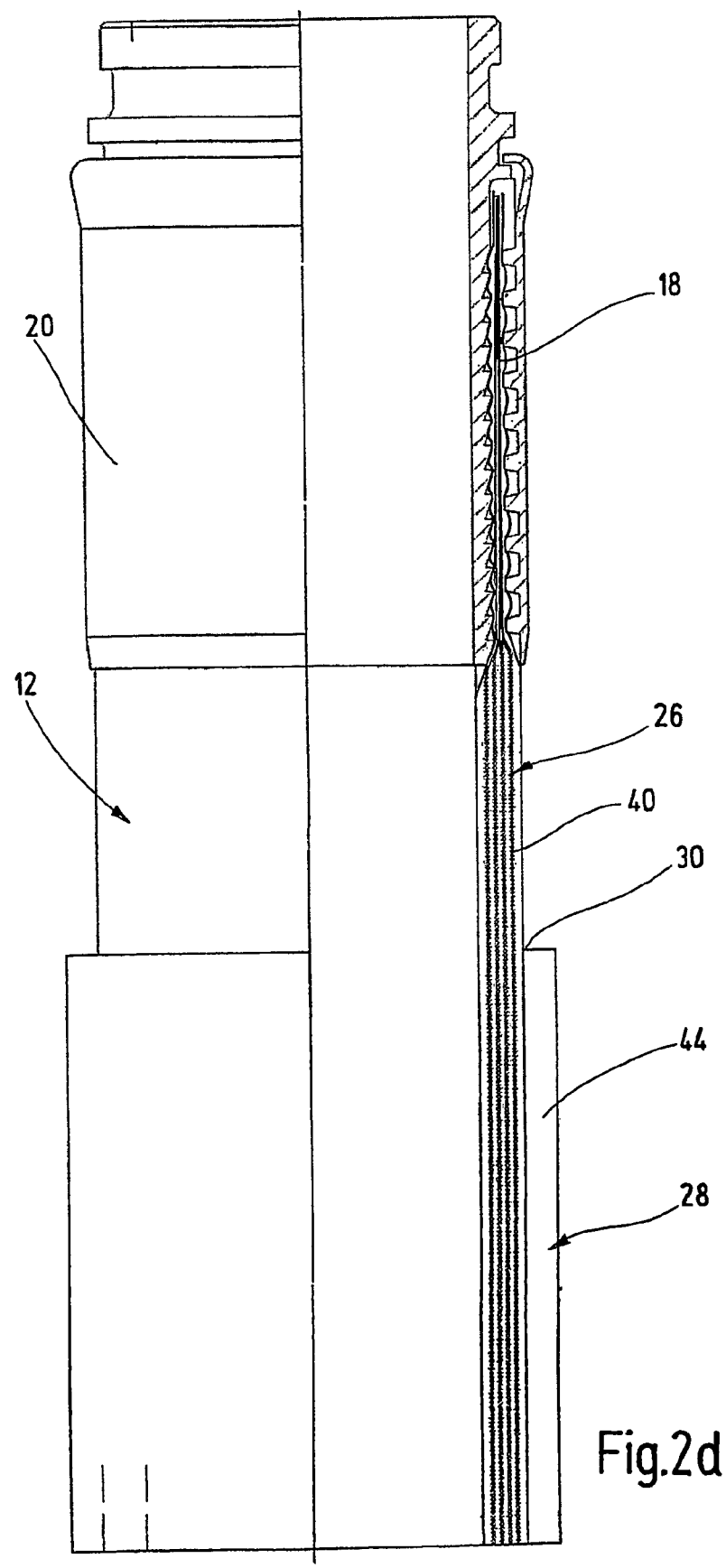

In the case of the exemplary embodiment according to FIG. 2d, a hose having a continuous woven fabric insert 42 and a uniform structure material 36 is provided. In the lower part, an additional elastomer cover hose 44 is vulcanized on, to form the lower hose part 28 that has greater bending rigidity.

Figure 2E:
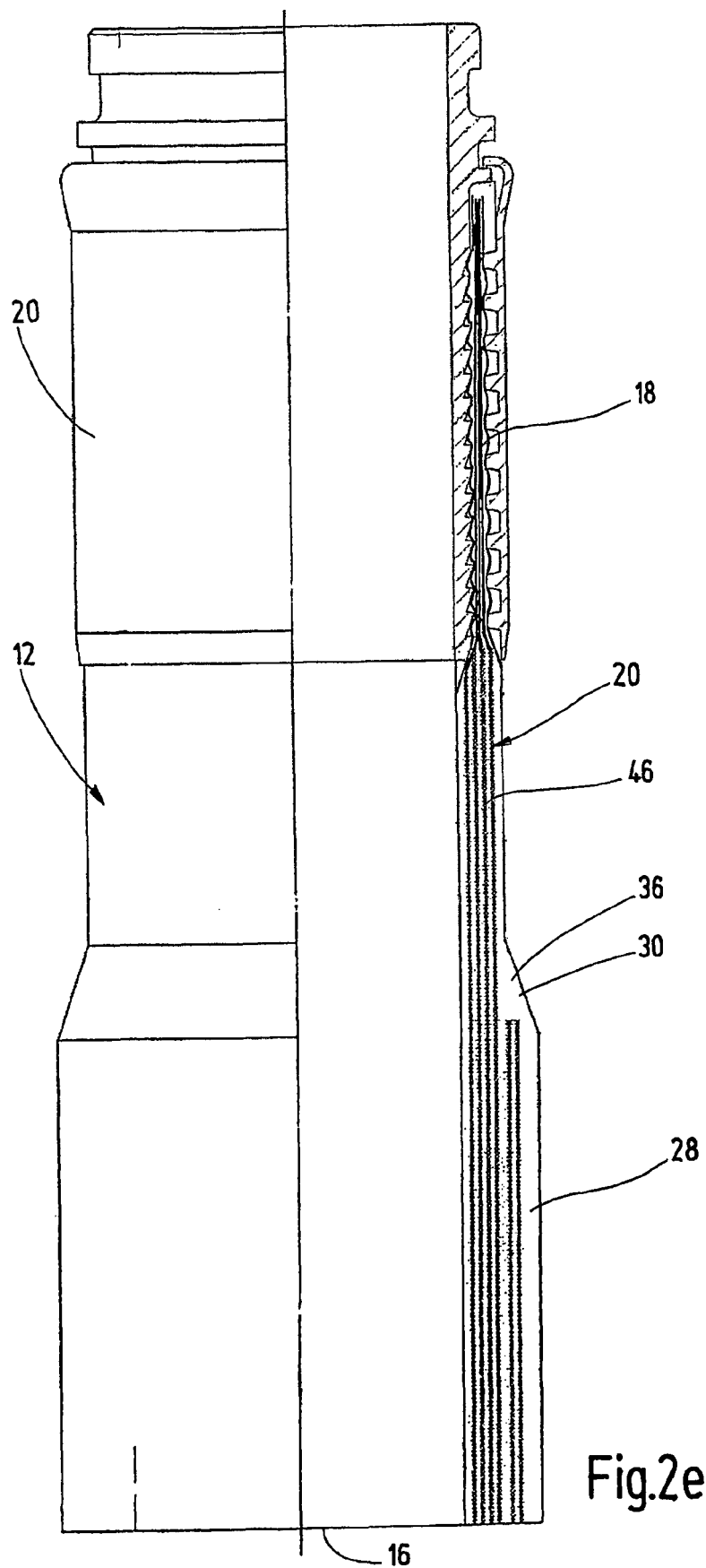

In the case of the exemplary embodiment according to FIG. 2e, a continuous rubber hose with a woven fabric insert 46 is provided, the inside diameter of which is constant and which has a smaller wall thickness in the region of the upper hose part 22 than in the region of the lower hose part 28. The wall thickness of the hose constantly increases in the transition region 30, from top to bottom.

Figure 2F:
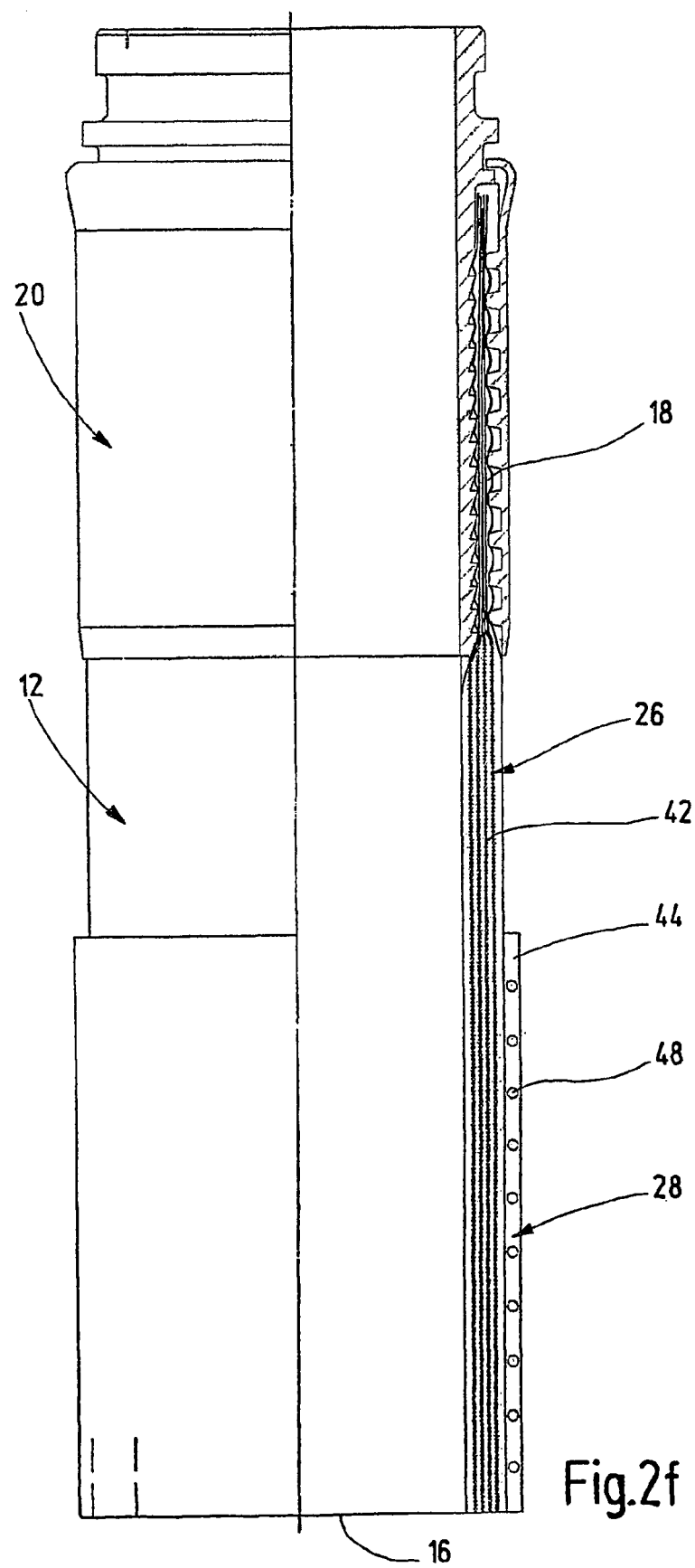

The exemplary embodiment shown in FIG. 2f essentially corresponds to the exemplary embodiment according to FIG. 2d. Here again, a rubber hose with a continuous woven fabric insert 42 is provided, onto which a cover hose 44 is vulcanized. Here, a metal spiral 48 is let into the cover hose 44, which makes it possible to reduce the wall thickness of the cover hose 40 while keeping the bending rigidity the same, as compared with the exemplary embodiment according to FIG. 2d.

Figure 3:
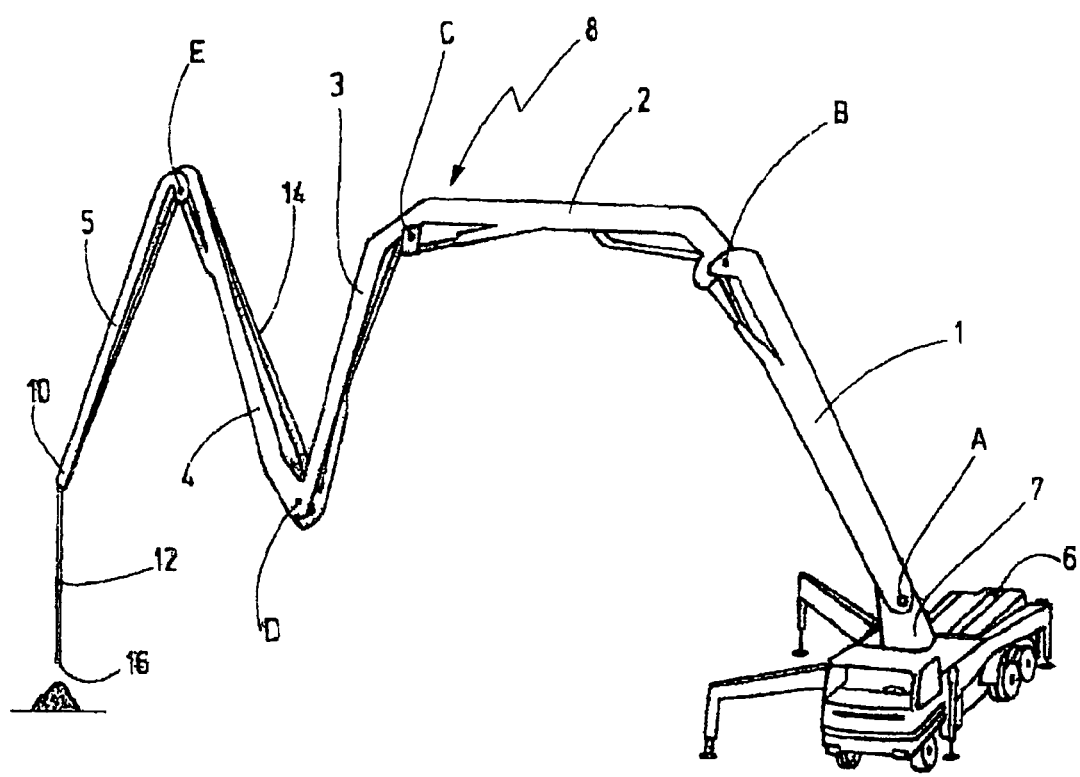
FIG. 3 a concrete pump truck with a distributor mast according to an embodiment of the invention.

FIG. 3 shows a concrete pump truck having a chassis 6 and a mast base 7, which can rotate about a vertical axis of rotation by 360°. Mast base 7 carries a distributor mast 8 as well as a pressure feed line 14, which line is guided by way of the mast arms 1, 2, 3, 4, 5 of distributor mast 8 and ends in the region of the mast tip 10 in an end hose 12. The mast arms are connected with mast base 7 and to each other at bending joints A, B, C, D, E.

In summary, the following should be stated:

The invention relates to an end hose for discharge of thick substances, particularly of liquid concrete. The end hose 12 can be connected with its entry-side end to a pressure feed line 14 of a mobile thick-matter pump, and has a discharge opening 16 for the thick substances at its exit-side end, and consists of a flexible material. In order to prevent the end hose 12 from kicking out when blockages are loosened, it has at least two hose parts 26, 28 having different bending rigidity, connected with one another at a transition point 30.

The invention claimed is:

1. Distributor mast of a concrete pump, having a plurality of mast arms connected with one another at bending joints, and having a pressure feed line composed of several segments, guided by way of the plurality of mast arms, to which liquid concrete is applied by way of a pump, having a mast tip at an end of the pressure feed line, and having an end hose that hangs down vertically and is connected to the end of the pressure feed line, the end hose comprising flexible material and having an entry-side hose part, the end hose having a discharge opening for the liquid concrete at its exit-side hose part, whereby the entry-side hose part and the exit-side hose part are connected with one another at a transition point, whereby the bending rigidity of the exit-side hose part, starting from the transition point, is greater than that of the entry-side hose part, whereby the entry-side hose part has a first elastomer hose material having a first material hardness, whereby the exit-side hose part has a second elastomer hose material having a second material hardness, and whereby the first material hardness is different from the second material hardness.

2. Distributor mast of a concrete pump according to claim 1, whereby the first elastomer hose material has a first wall thickness, whereby the second elastomer hose material has a second wall thickness, and whereby the first thickness is different from the second wall thickness.

3. Distributor mast of a concrete pump according to claim 1, whereby the first elastomer hose material has a first insert, whereby the second elastomer hose material has a second insert, and whereby the first insert is different from the second insert.

4. Distributor mast according to claim 3, wherein at least one of the first insert and the second insert is a woven fabric insert.

5. Distributor mast according to claim 1, wherein at least one of the entry-side and exit-side hose parts contains a first steel wire insert.

6. Distributor mast according to claim 3, wherein the insert amount or density of the entry-side hose part is different from the insert amount or density of the exit-side hose part.

7. Distributor mast according to claim 1, wherein the inside diameter of the entry-side and exit-side hose parts is constant.

8. Distributor mast according to claim 1, wherein the entry-side and exit-side hose parts are connected with one another in one piece at the transition point.

9. Distributor mast according to claim 1, wherein the wall thickness of the entry-side and exit-side hose parts increases or decreases in the transition region.

10. Distributor mast according to claim 5, wherein the first steel wire insert is in the entry-side hose part and wherein a second steel wire insert is in the exit-side hose part, and wherein the second steel wire insert in the exit-side hose part is wound more tightly than the first steel wire insert in the entry-side hose part.

11. Distributor mast according to claim 4, wherein each of the first insert and the second insert is a woven fabric insert, and wherein the second insert in the exit-side hose part is braided or woven more tightly than the first insert in the entry-side hose part.

12. Distributor mast according to claim 1, wherein the exit-side hose part carries a reinforcement cover.

13. Distributor mast according to claim 12, wherein the reinforcement cover consists of elastomer plastic.

14. Distributor mast according to claim 1, wherein the entry-side and the exit-side hose parts are releasably coupled with one another.

15. Distributor mast according to claim 1, wherein the exit-side hose part contains a steel insert and the entry-side hose part contains a woven fabric insert.

16. Distributor mast according to claim 1, wherein the pressure feed line consists of several line segments of a metal or a composite material.

* * * * *